(12) United States Patent
Iida et al.

(10) Patent No.: US 12,459,526 B2
(45) Date of Patent: Nov. 4, 2025

(54) DRIVING ASSISTANCE DEVICE

(71) Applicant: TOYOTA JIDOSHA KABUSHIKI KAISHA, Toyota (JP)

(72) Inventors: Taiki Iida, Nisshin (JP); Yusuke Tatesumi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 18/456,947

(22) Filed: Aug. 28, 2023

(65) Prior Publication Data

US 2025/0074442 A1 Mar. 6, 2025

(30) Foreign Application Priority Data

Nov. 11, 2022 (JP) ................. 2022-181196

(51) Int. Cl.
*B60W 50/14* (2020.01)
*B60W 40/06* (2012.01)
*G06V 20/58* (2022.01)

(52) U.S. Cl.
CPC ............ *B60W 50/14* (2013.01); *B60W 40/06* (2013.01); *G06V 20/58* (2022.01); *B60W 2420/403* (2013.01); *B60W 2554/4046* (2020.02)

(58) Field of Classification Search
CPC ................. B60W 40/06; B60W 50/14; B60W 2554/4046; B60W 2420/403; G06V 20/58
USPC ............................................................ 701/1
See application file for complete search history.

(56) References Cited

U.S. PATENT DOCUMENTS

| | | | |
|---|---|---|---|
| 7,930,096 B2 * | 4/2011 | Kubota | ................. G08G 1/167 701/1 |
| 7,968,032 B2 * | 6/2011 | Pal | .................... A61M 25/0014 264/262 |
| 10,417,512 B2 * | 9/2019 | Yamataka | ............... G06F 3/013 |
| 10,427,689 B2 | 10/2019 | Tokimasa et al. | |
| 10,486,698 B2 | 11/2019 | Masui et al. | |
| 10,731,996 B2 | 8/2020 | Naito | |
| 10,922,561 B2 | 2/2021 | Ozawa et al. | |

(Continued)

FOREIGN PATENT DOCUMENTS

| | | |
|---|---|---|
| JP | 2004-220348 A | 8/2004 |
| JP | 2006-293531 A | 10/2006 |

(Continued)

*Primary Examiner* — Andrew Joseph Rudy
(74) *Attorney, Agent, or Firm* — SoraIP, Inc

(57) ABSTRACT

The driving assistance device includes: a fluctuation amount recognition unit; a driver abnormality recognition unit that recognizes an abnormality of a driver of another vehicle based on a captured image of an external camera provided in a vehicle; an abnormal state determination unit that determines whether the other vehicle is in a fluctuation abnormality state based on a comparison result between a fluctuation amount of the other vehicle and the fluctuation threshold; and a notification control unit that performs notification regarding the fluctuation abnormality state. The abnormal state determination unit determines whether a fluctuation abnormal state is present, with the fluctuation threshold value in a case where an abnormality of the driver of the other vehicle is recognized as a smaller absolute value than the fluctuation threshold value in a case where an abnormality of the driver of the other vehicle is not recognized.

3 Claims, 7 Drawing Sheets

(56) References Cited

U.S. PATENT DOCUMENTS

| | | | |
|---|---|---|---|
| 11,017,247 B2 | 5/2021 | Hayashi et al. | |
| 11,072,328 B2 | 7/2021 | Masui et al. | |
| 11,235,766 B2 | 2/2022 | Masui et al. | |
| 11,247,671 B2 | 2/2022 | Komori | |
| 11,267,480 B2 * | 3/2022 | Tamagaki | B60T 7/14 |
| 11,377,126 B2 * | 7/2022 | Kato | B60W 50/00 |
| 11,472,345 B2 * | 10/2022 | Rötzer | B60R 1/08 |
| 11,529,960 B2 * | 12/2022 | Lee | H04L 12/40071 |
| 11,919,528 B2 * | 3/2024 | Nemoto | H04W 4/46 |
| 12,300,113 B2 * | 5/2025 | Hayward | H04L 65/611 |
| 2020/0326191 A1 | 10/2020 | Naito | |
| 2021/0291732 A1 * | 9/2021 | Woo | H04W 4/46 |
| 2021/0364631 A1 | 11/2021 | Hasegawa et al. | |

FOREIGN PATENT DOCUMENTS

| | | |
|---|---|---|
| JP | 2018-195301 A | 12/2018 |
| JP | 2022-043784 A | 3/2022 |

\* cited by examiner

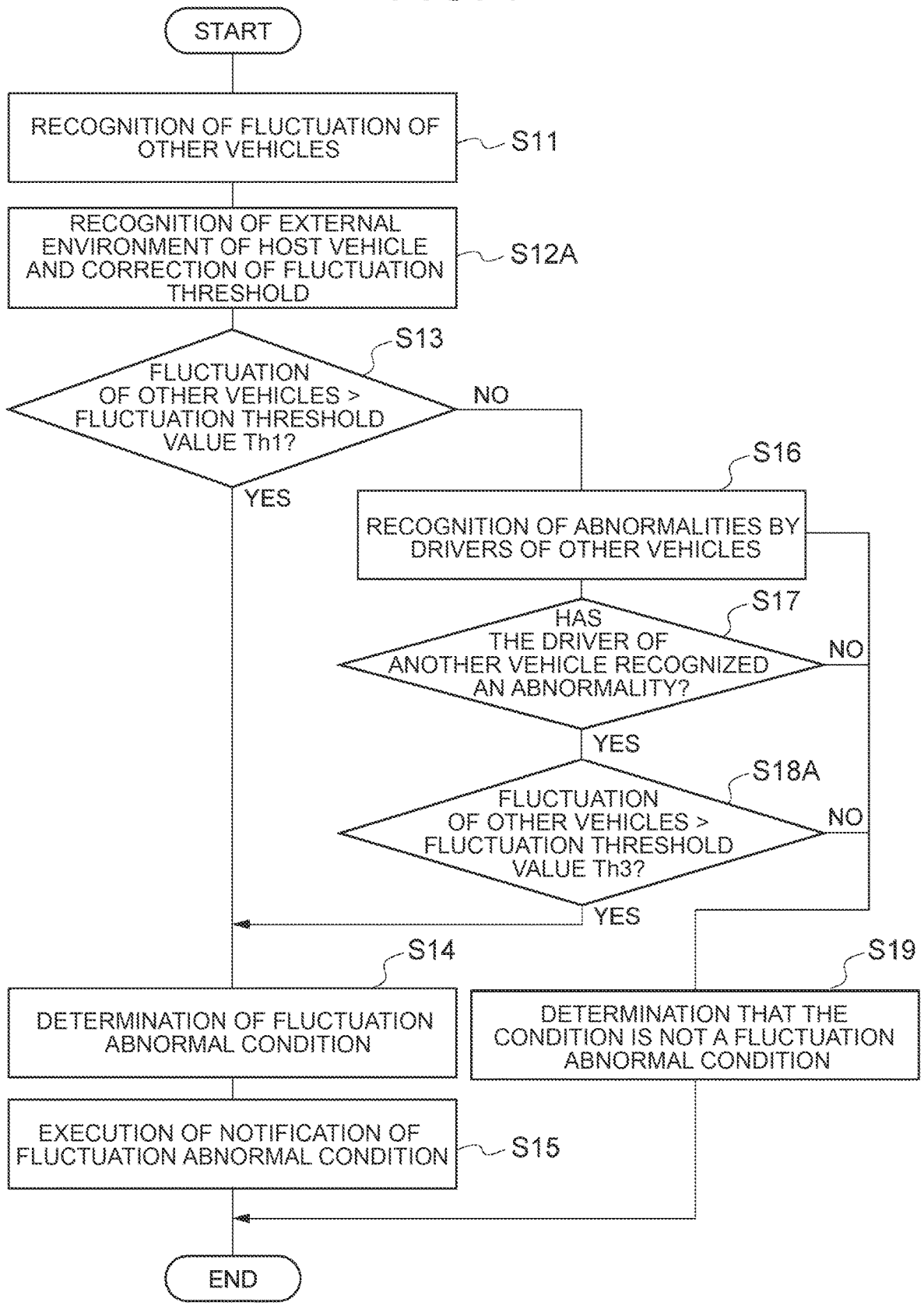

DRIVING ASSISTANCE DEVICE

CROSS-REFERENCE TO RELATED APPLICATION

This application claims priority to Japanese Patent Application No. 2022-181196 filed on Nov. 11, 2022, incorporated herein by reference in its entirety.

BACKGROUND

1. Technical Field

The present disclosure relates to a driving assistance device.

2. Description of Related Art

Conventionally, there has been known a driving assistance device that calculates driving performance based on a behavior and a driver's condition of a rear vehicle that are acquired by using a monitoring unit that monitors the rear of a vehicle, and issues a notification to the driver of the vehicle in accordance with the driving performance (for example, Japanese Unexamined Patent Application Publication No. 2006-293531 (JP 2006-293531 A)).

SUMMARY

A fluctuation amount of another vehicle that is recognized based on a detection result of an external sensor provided in a vehicle may include, in addition to a fluctuation amount caused by an abnormality of a driver of the other vehicle, a fluctuation amount caused by an external environment such as the wind or a road surface condition, for example. Therefore, it is desired to perform driving assistance including a notification to an occupant of the vehicle in accordance with the cause of the fluctuation amount of the other vehicle.

A driving assistance device according to an aspect of the present disclosure is a driving assistance device that performs driving assistance including a notification to an occupant of a vehicle. The driving assistance device includes: a fluctuation amount recognition unit that recognizes a fluctuation amount of another vehicle traveling around the vehicle, based on a detection result of an external sensor provided in the vehicle; a driver abnormality recognition unit that recognizes an abnormality of a driver of the other vehicle, based on a captured image of an external camera provided in the vehicle; an abnormal state determination unit that determines whether the other vehicle is in a fluctuation abnormal state, based on a comparison result between the fluctuation amount of the other vehicle and a fluctuation threshold value; and a notification control unit that issues the notification about the fluctuation abnormal state. With an absolute value of the fluctuation threshold value in a case where the abnormality of the driver of the other vehicle is recognized being set to be smaller than an absolute value of the fluctuation threshold value in a case where the abnormality of the driver of the other vehicle is not recognized, the abnormal state determination unit determines whether the fluctuation abnormal state is present.

In the driving assistance device according to the aspect of the present disclosure, with the absolute value of the fluctuation threshold value in a case where the abnormality of the driver of the other vehicle is recognized being set to be smaller than the absolute value of the fluctuation threshold value in a case where the abnormality of the driver of the other vehicle is not recognized, it is determined whether the fluctuation abnormal state is present. Accordingly, even when the amount of fluctuation in the case where the abnormality of the driver of the other vehicle is recognized is about the same as the amount of fluctuation of the driver of the other vehicle in the case where the abnormality of the driver of the other vehicle is not recognized and the other vehicle is fluctuated due to the external environment such as the wind or the road surface condition, for example, the case where the abnormality of the driver of the other vehicle is recognized is likely to be determined that the fluctuation abnormality state is present. Therefore, with the driving assistance device according to the aspect of the present disclosure, it is possible to perform the driving assistance including the notification to the occupant of the vehicle, in accordance with the cause of the fluctuation amount of the other vehicle.

In an embodiment, the fluctuation amount recognition unit may recognize a road surface condition of a road on which the vehicle and the other vehicle travel, based on the captured image of the external camera, and correct the fluctuation amount of the other vehicle based on the road surface condition. In this case, by using the fluctuation amount corrected based on the road surface condition, it is possible to more appropriately determine whether the other vehicle is in the fluctuation abnormal state, in accordance with the road surface condition.

According to the present disclosure, it is possible to appropriately perform the driving assistance including the notification to the occupant of the vehicle, in accordance with the cause of the fluctuation amount of the other vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flow chart illustrating a process of the driving assistance device according to modification.

DETAILED DESCRIPTION OF EMBODIMENTS

Figure 1:
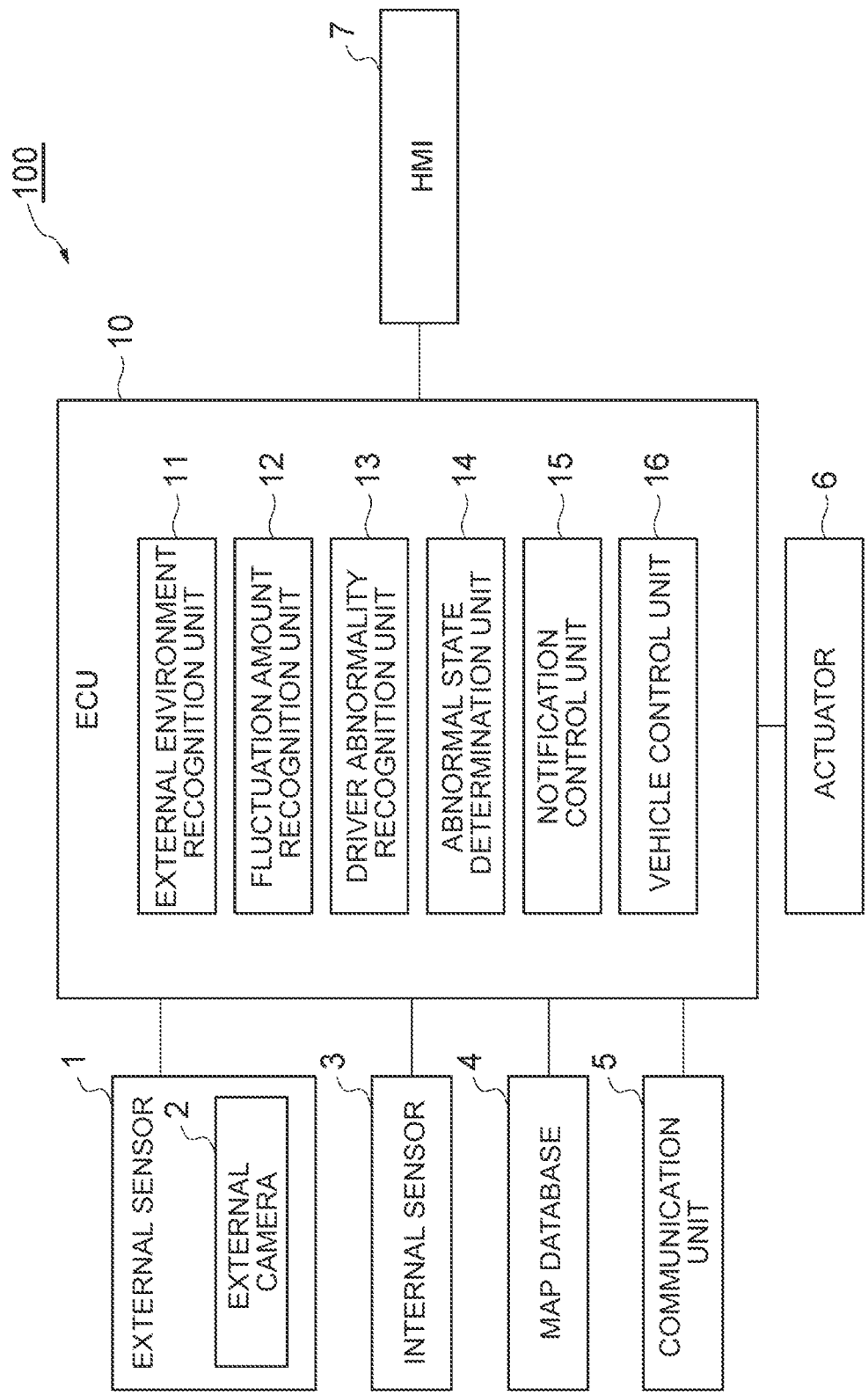
FIG. 1 is a block diagram illustrating a configuration of a driving assistance device according to an embodiment.

Hereinafter, embodiments of the present disclosure will be described with reference to the drawings. In the following description, the same or corresponding elements are denoted by the same reference numerals, and redundant description thereof will be omitted.

FIG. 1 is a block diagram illustrating a configuration of a driving assistance device according to an embodiment. The driving assistance device 100 illustrated in FIG. 1 is mounted on a vehicle such as a passenger car, and controls the vehicle based on detection results of various sensors mounted on the vehicle. The control of the vehicles includes HMI control such as driving assistance control and notification to the driver (occupant). The control of the vehicle may include autonomous driving control. The autonomous driving control is a vehicle control that causes the vehicle to automatically travel along a target route. In the automatic driving control, the driver does not need to perform a driving operation, and the vehicle travels automatically. The driving assistance control is vehicle control that assists the driver in driving the vehicle. HMI control such as notification to the driver will be described later.

Configuration of Driving Assistance Device

As illustrated in FIG. 1, the driving assistance device 100 includes an Electronic Control Unit (ECU) 10 that comprehensively manages the driving assistance device. ECU 10 is an electronic control unit having Central Processing Unit (CPU), Read Only Memory (ROM), Random Access Memory (RAM), Controller Area Network (CAN) communication circuitry, etc. In ECU 10, for example, various functions are realized by loading a program stored in a ROM into a RAM and executing the program loaded in RAM by a CPU. ECU 10 may be composed of a plurality of electronic units.

ECU 10 is connected to an external sensor 1, an internal sensor 3, a map database 4, an actuator 6, and a Human Machine Interface (HMI) 6.

The external sensor 1 is a detection device that detects a situation around the host vehicle. The external sensor 1 includes an external camera 2. The external sensor 1 may include a radar sensor.

The external camera 2 is an imaging device that captures an image of an external state of the host vehicle. The external camera 2 includes a front camera 2a and a rear camera 2b. The front camera 2a is provided on the rear side of the windshield of the host vehicle. The rear camera 2b is provided on the rear side of the rear glass of the host vehicle. The rear camera 2b is, for example, a camera for an electronic inner mirror, and has a higher image quality than a rear view camera for parking. The external camera 2 may include a camera that captures an image of an external situation on the side of the host vehicle. The external camera 2 transmits an image of the external condition of the host vehicle to ECU 10. The external camera 2 may be a monocular camera or a stereo camera. The stereo camera has two imaging units arranged to reproduce binocular parallax. The imaging information of the stereo camera also includes information in the depth direction.

The radar sensor is a detection device that detects an object in the vicinity of the host vehicle using radio waves (for example, millimeter waves) or light. The radar sensor includes, for example, a millimeter-wave radar or a Light Detection and Ranging (LIDAR). The radar sensor transmits radio waves or light to the surroundings of the host vehicle, and detects the object by receiving the radio waves or light reflected by the object. The radar sensor transmits the detected object data to ECU 10. Objects include fixed obstacles such as guardrails, buildings, etc., as well as moving obstacles such as pedestrians, bicycles, other vehicles, etc.

The internal sensor 3 is a detection device for detecting a vehicle state of the host vehicle. The internal sensor 3 includes a vehicle speed sensor, an acceleration sensor, and a yaw rate sensor. The vehicle speed sensor is a detector that detects the speed of the host vehicle. The vehicle speed sensor transmits the detected vehicle speed information (wheel speed information) to ECU 10. The acceleration sensor is a detector that detects acceleration of the host vehicle. The acceleration sensor transmits acceleration data of the host vehicle to ECU 10. The yaw rate sensor is a detector that detects a yaw rate (rotational angular velocity) around a vertical axis of a center of gravity of the host vehicle. As the yaw rate sensor, for example, a gyro sensor can be used. The yaw rate sensor transmits the detected yaw rate of the host vehicle to ECU 10.

The map database 4 is a database that stores map information. The map database 4 is formed in, for example, a Hard Disk Drive (HDD) mounted on the host vehicle. The map information includes location information of a road, information of a road shape (for example, a curve, a type of a straight portion, a curvature of a curve, and the like), location information of an intersection and a branch point, and location information of a structure. The map information may also include, for example, information indicating that a vehicle traveling on a lateral wind, an irregular road surface, or the like is a place that is likely to fluctuate. The map database 4 may be provided in a management center or the like capable of communicating with the host vehicle.

The communication unit 5 is a communication device that controls wireless communication with the outside of the host vehicle. The communication unit 5 communicates various kinds of information with the server via a communication network, for example. The communication unit 5 may perform inter-vehicle communication. The communication unit 5 is not particularly limited, and various known communication devices can be used.

The actuator 6 is a device used for controlling the host vehicle. The actuator 6 includes at least a drive actuator, a brake actuator, and a steering actuator. The driving actuator controls the driving force of the host vehicle by controlling an engine, a motor, or the like in response to a control signal from ECU 10. The brake actuator controls a braking force applied to a wheel of the host vehicle by controlling the brake system in response to a control signal from ECU 10. As the brake system, for example, a hydraulic brake system can be used. The steering actuator controls driving of an assist motor that controls the steering torque in the electric power steering system in response to a control signal from ECU 10. Thus, the steering actuator controls the steering torque of the host vehicle.

HMI 7 is an interface for inputting and outputting data between the driving assistance device 100 and the driver of the host vehicle. HMI 7 may include, for example, a display provided at a position visible to the driver, and a speaker provided inside the vehicle cabin of the door of the host vehicle. HMI 7 outputs images of the display and sounds from the speakers in response to control signals from ECU 10. The display may be a Head Up Display (HUD) for projecting and displaying on a windshield of the host vehicle. The display may be a device for outputting a light source such as a Multi Information Display (MID) or a LED. A means for giving a sensible stimulus to the driver of the host vehicle by vibrating the steering, the pedal, the seat, or the like may be used.

Next, the functional configuration of ECU 10 will be described. ECU 10 includes an external environment recognition unit 11, a fluctuation amount recognition unit 12, a driver abnormality recognition unit 13, an abnormal state determination unit 14, a notification control unit 15, and a vehicle control unit 16. Some of the functions of ECU 10 described below may be implemented in servers of facilities such as administrative centers capable of communicating with the host vehicle.

The external environment recognition unit 11 recognizes the external environment of the host vehicle based on the detection results of the external sensor 1 and the external camera 2. The external environment includes a road surface condition, a position of the other vehicle with respect to the host vehicle, a relative speed of the other vehicle with respect to the host vehicle, a moving direction of the other vehicle with respect to the host vehicle, and the like. The external environment recognition unit 11 recognizes the external environment of the host vehicle by a well-known method based on the object information of the radar sensor, the captured image of the external camera 2, and the like.

The fluctuation amount recognition unit 12 recognizes the fluctuation amount of the other vehicle traveling around the host vehicle based on the detection result of the external sensor 1 provided in the host vehicle. The fluctuation amount of the other vehicle means the magnitude of the behavior of the other vehicle, and is used to determine the presence or absence of an abnormality in the other vehicle. The fluctuation amount of the other vehicle may be a fluctuation width in the vehicle width direction when the other vehicle meanders in the vehicle width direction. For example, the fluctuation amount of the other vehicle in the captured image of the rear camera 2b may be the longitudinal acceleration of the other vehicle when the other vehicle accelerates rapidly in the traveling direction.

Figure 2:
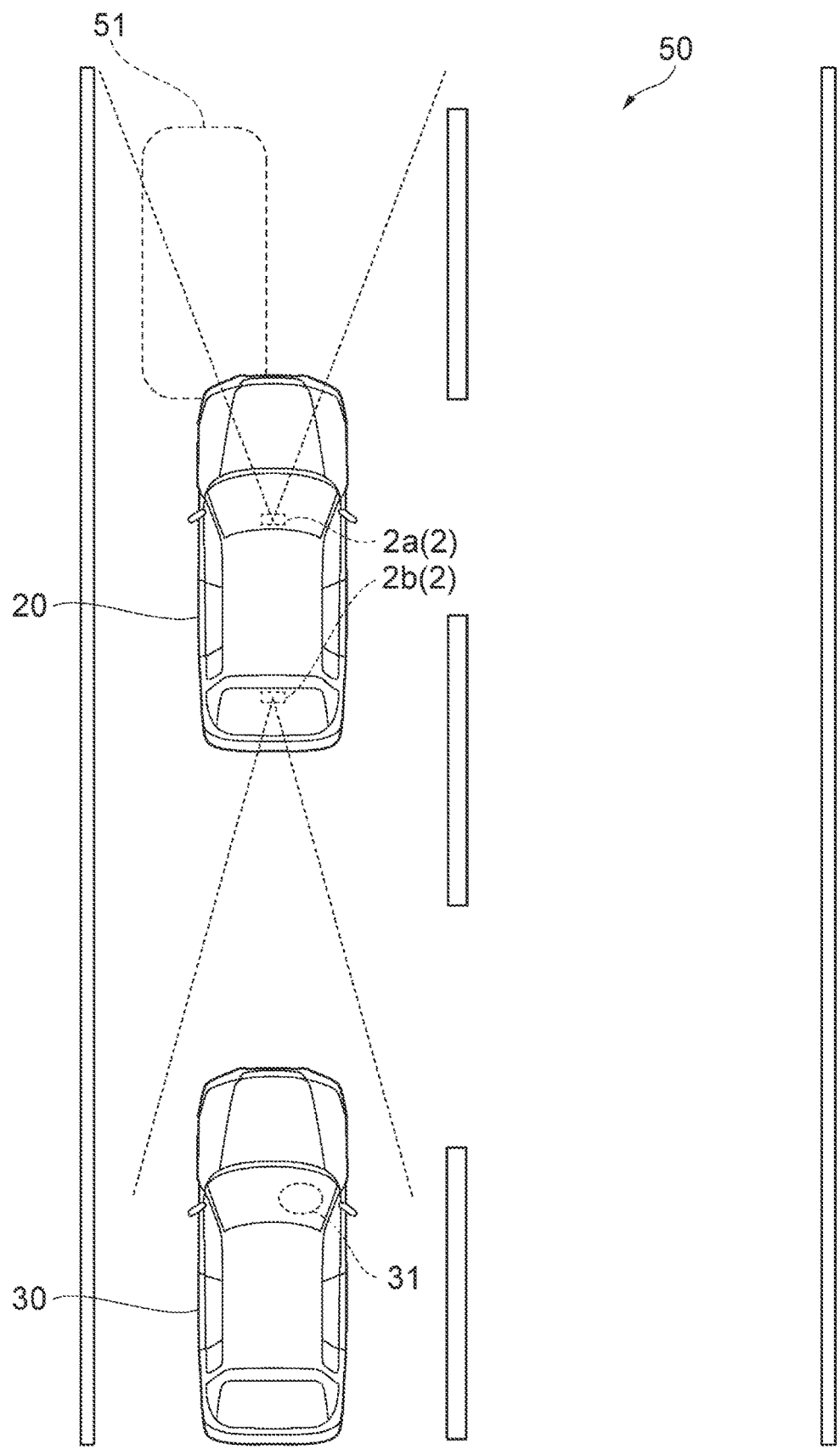
FIG. 2 is a plan view illustrating a relationship between the host vehicle and another vehicle.

FIG. 2 is a plan view illustrating a relationship between the host vehicle and another vehicle. In FIG. 2, as an example, it is assumed that the host vehicle 20 and the other vehicle 30 are traveling in the same lane of the road 50. As illustrated in FIG. 2, the other vehicle 30 is imaged by the rear camera 2b of the host vehicle 20. In the captured images of the rear camera 2b, the other vehicles 30 are seen in a front view. For example, the fluctuation amount recognition unit 12 recognizes the fluctuation amount when the other vehicle 30 meanders in the vehicle width direction, with the movement amount of the other vehicle 30 in the vehicle width direction as the fluctuation width in the time-series data of the captured images of the rear camera 2b. For example, the fluctuation amount recognition unit 12 may recognize the longitudinal acceleration of the other vehicle when the other vehicle accelerates rapidly in the traveling direction based on the object information detected by the radar sensor and the detection result of the internal sensor 3 of the host vehicle 20.

The fluctuation amount recognition unit 12 may recognize a rut (road surface condition) 51 in front of the host vehicle 20 based on the captured image of the external camera 2 of the host vehicle 20, and correct the fluctuation amount of the other vehicle 30 based on the rut 51. For example, as shown in FIG. 2, a rut 51 in front of the host vehicle 20 is captured by the front camera 2a of the host vehicle 20. When the tire of the host vehicle 20 and the other vehicle 30 is taken by the rut 51, the host vehicle 20 moves in the vehicle width direction with a constant fluctuation amount by the rut 51, and the subsequent other vehicle 30 also moves in the vehicle width direction with a constant fluctuation amount by the rut 51. In this case, if the influence of the host vehicle 20 moving in the vehicle width direction is in the same phase as the fluctuation amount of the other vehicle 30, there is a possibility that the fluctuation amount of the other vehicle 30 viewed from the host vehicle 20 is apparently reduced.

Therefore, when the fluctuation amount recognition unit 12 recognizes the rut (road surface condition) 51 in front of the host vehicle 20 based on the captured images of the front-camera 2a of the host vehicle 20, the fluctuation amount of the other vehicle 30 may be corrected based on the rut 51. For example, the fluctuation amount recognition unit 12 may add a predetermined correction amount to the fluctuation amount of the other vehicle 30 while the host vehicle 20 is traveling on the recognized rut 51. The predetermined correction amount is a correction value of the fluctuation amount of the other vehicle 30 for suppressing the abnormality of the other vehicle 30 from being difficult to recognize due to the influence of the behavior of the host vehicle 20. The predetermined correction amount can be an average fluctuation amount of the behavior of the host vehicle 20 so that the abnormality of the other vehicle 30 can be easily recognized.

Similar to the example of the rut 51, the fluctuation amount recognition unit 12 may correct the fluctuation amount of the other vehicle 30 even when the fluctuation amount of the host vehicle 20 becomes equal to or greater than a certain value, or when the wind speed of the weather information received by the communication unit 5 becomes equal to or greater than a certain value. The fluctuation amount of the host vehicle 20 may be recognized based on the captured image of the external camera 2.

The driver abnormality recognition unit 13 recognizes an abnormality of the driver 31 of the other vehicle 30 based on a captured image of the external camera 2 provided in the host vehicle 20. For example, the driver abnormality recognition unit 13 recognizes an abnormality of the driver 31 of the other vehicle 30 based on the position of the head of the driver 31 of the other vehicle 30 in the captured images of the rear camera 2b provided in the host vehicle 20. As illustrated in FIG. 2, the driver 31 of the other vehicle 30 is imaged by the rear camera 2b of the host vehicle 20. When the driver 31 normally drives the other vehicle 30, the head of the driver 31 is within a certain range including the driver's seat that is visible through the windshield of the other vehicle 30 in the front view of the other vehicle 30. Therefore, when the head of the driver 31 does not exist within the predetermined range, for example, when the upper body of the driver 31 falls down, it can be estimated that there is an abnormality in the driver 31 of the other vehicle 30.

For example, when the rear camera 2b has a higher resolution than the camera for the electronic inner mirror and the line-of-sight information of the driver 31 of the other vehicle 30 can be recognized, the driver abnormality recognition unit 13 may recognize the abnormality of the driver 31 of the other vehicle 30 based on the line-of-sight direction of the driver 31 of the other vehicle 30 in the captured image of the rear camera 2b. The line-of-sight information of the driver 31 of the other vehicle 30 may be recognized using, for example, a method similar to the line-of-sight recognition using the driver monitor camera in the host vehicle 20.

The driver abnormality recognition unit 13 may recognize an abnormality of the driver 31 of the other vehicle 30 based on the information of the other vehicle 30 acquired via the communication unit 5 in addition to the captured image of the external camera 2. The communication unit 5 receives a signal including driver information of the other vehicle 30 from the other vehicle 30 by inter-vehicle communication. The driver information of the other vehicle 30 may include information such as the attitude and line of sight of the driver 31 based on the captured image of the driver monitor camera of the other vehicle 30, the gripping force of the steering of the driver 31, time-series data of the steering operation of the driver 31, and time-series data of the pedal operation of the driver 31.

The abnormal state determination unit 14 determines whether or not the other vehicle 30 is in a fluctuation abnormal state based on a comparison result between the fluctuation amount of the other vehicle 30 and the fluctuation threshold value. The fluctuation abnormal state is a state in which the other vehicle 30 is traveling abnormally accompanied by fluctuation or rapid acceleration of a certain level or more. The fluctuation threshold value is a threshold value of the fluctuation amount of the other vehicle 30 for determining whether or not the fluctuation abnormal state is present. For example, when the fluctuation amount of the other vehicle 30 is larger than the fluctuation threshold, the abnormal state determination unit 14 determines that the other vehicle 30 is in the fluctuation abnormal state. For example, when the fluctuation amount of the other vehicle 30 is equal to or less than the fluctuation threshold, the abnormal state determination unit 14 determines that the other vehicle 30 is not in the fluctuation abnormal state.

The fluctuation abnormal state is mainly caused by an abnormality of the driver 31 of the other vehicle 30, but may also be caused by an external environment such as wind or road surface conditions. Therefore, the abnormal state determination unit 14 changes the fluctuation threshold in accordance with the cause of the fluctuation amount of the other vehicle 30, and determines whether or not the fluctuation abnormal state is present in accordance with the cause.

Figure 3:
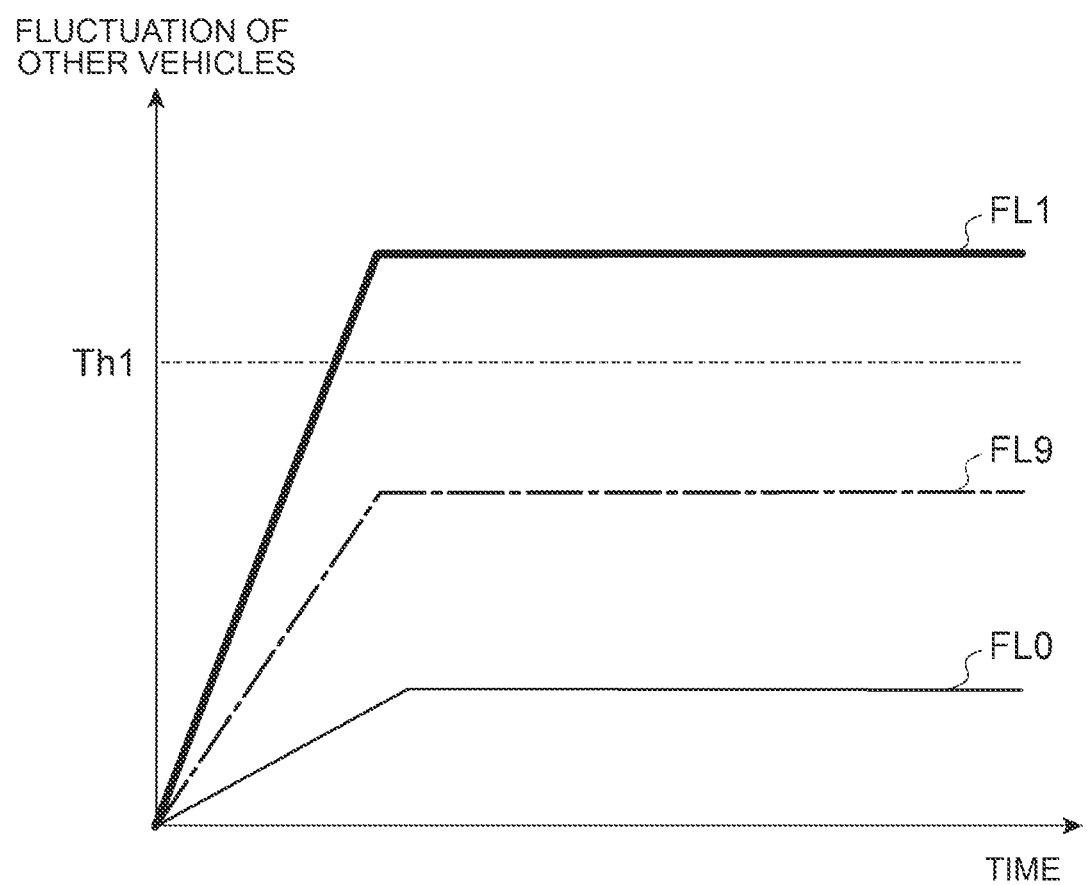
FIG. 3 is a diagram illustrating a fluctuation threshold value in a case where an abnormality of a driver of another vehicle is not recognized.

FIG. 3 is a diagram illustrating a fluctuation threshold value in a case where an abnormality of a driver of another vehicle is not recognized. In FIG. 3, the horizontal axis represents time, and the vertical axis represents the fluctuation amount of the other vehicle. FIG. 3 shows an example of a plurality of schematic fluctuation amounts. The drawing of the fluctuation amount in FIG. 3 is an example for simplifying the description, and as a result of drawing the maximum value of the fluctuation amount recognized during a predetermined period of time, for example, the fluctuation amount increases from the origin and becomes constant at each value. The description of this paragraph is the same for FIG. 4 and FIG. 6.

In FIG. 3, the fluctuation amount FL0 is the fluctuation amount of the other vehicle 30 while the other vehicle 30 is traveling normally without the fluctuation or the rapid acceleration of a certain level or more. The fluctuation amount FL1 is the fluctuation amount of the other vehicle 30 while the other vehicle 30 is traveling abnormally with a fluctuation or rapid acceleration of a certain value or more. The fluctuation amount FL9 is the fluctuation amount of the other vehicle 30 in a state in which the driver 31 of the other vehicle 30 has no abnormality and the other vehicle 30 is traveling normally without a certain amount of fluctuation or rapid acceleration, but is fluctuated due to an external environment such as wind or road surface conditions.

In a state in which the other vehicle 30 fluctuates only by the external environment such as the wind or the road surface condition, if the fluctuation abnormal state is determined, there is a possibility that an unnecessary notification is made to the occupant of the host vehicle 20 by the notification control unit 15, which will be described later. Therefore, the fluctuation threshold value Th1 is set to be larger than the fluctuation amount of the other vehicle 30 in a condition where the driver 31 of the other vehicle 30 has no abnormality and the other vehicle 30 is traveling normally without a certain amount of fluctuation or rapid acceleration, but is fluctuated due to an external environment such as wind or road surface conditions. The fluctuation threshold value Th1 is a preset value, and is switched to another threshold value (described later) by the abnormal state determination unit 14 according to, for example, whether or not an abnormality of the driver 31 of the other vehicle 30 has been recognized. Accordingly, the abnormal state determination unit 14 determines that the other vehicle 30 is in the fluctuation abnormal state with respect to the fluctuation amount FL1 larger than the fluctuation threshold value Th1. The abnormal state determination unit 14 determines that the other vehicle 30 is not in the fluctuation abnormal state with respect to the fluctuation amount FL9, FL0 that is equal to or smaller than the fluctuation threshold value Th1.

Figure 4:
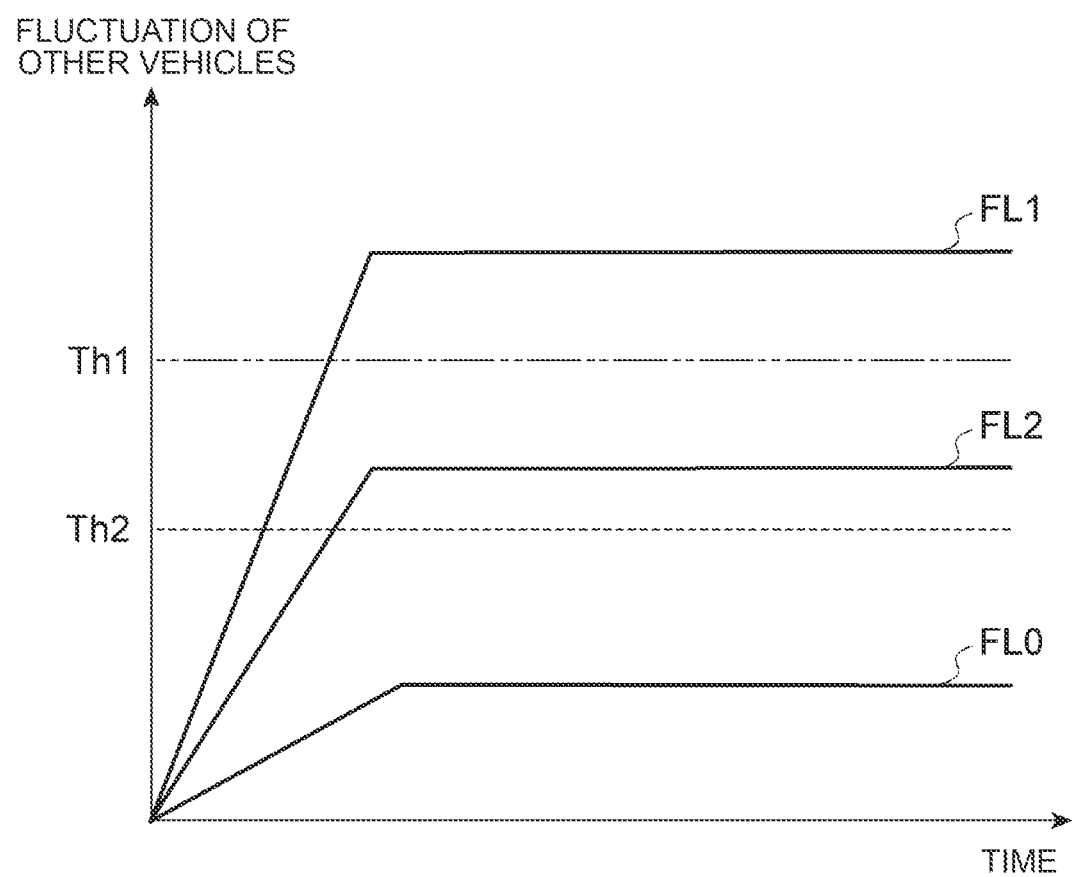
FIG. 4 is a diagram illustrating a fluctuation threshold value when an abnormality of a driver of another vehicle is recognized.

FIG. 4 is a diagram illustrating a fluctuation threshold value in a case where an abnormality of a driver of another vehicle is recognized. In FIG. 4, the fluctuation amount FL0 and the fluctuation amount FL1 are the same as the fluctuation amount shown in FIG. 3. The fluctuation amount FL2 is the fluctuation amount of the other vehicle 30 in a condition where the driver 31 of the other vehicle 30 is abnormal, although the other vehicle 30 is traveling without a certain amount of fluctuation or rapid acceleration. The situation corresponding to the fluctuation amount FL2 includes, for example, a situation in which, although the driving assistance control or the automated driving control is being executed by the other vehicle 30, the fluctuation amount of the other vehicle 30 is increased to the level of the fluctuation amount FL2 due to an anomaly in the driver 31 of the other vehicle 30. The fluctuation amount FL2 may or may not include a fluctuation amount due to an external environment such as air or road surface conditions.

In the fluctuation amount FL2, since the driver 31 of the other vehicle 30 is abnormal, there is a possibility that the fluctuation amount of the other vehicle 30 will increase to the level of the fluctuation amount FL1 in the future. Therefore, ECU 10 changes the fluctuation thresholds so that it is easy to determine that the other vehicle 30 is in a fluctuation abnormal condition. That is, the abnormal state determination unit 14 determines whether or not a fluctuation abnormal state is present, using the fluctuation threshold value Th2 when the abnormality of the driver 31 of the other vehicle 30 is recognized as an absolute value smaller than the fluctuation threshold value Th1 when the abnormality of the driver 31 of the other vehicle 30 is not recognized. The fluctuation threshold value Th2 is smaller than a preset fluctuation threshold value Th1, and can be set based on a test-run in advance or the like.

Thus, in FIG. 4, the fluctuation amount FL2 is equivalent to the fluctuation amount FL9 in FIG. 3. By changing the fluctuation threshold based on whether or not the abnormality of the driver 31 of the other vehicle 30 is recognized, it is determined that the fluctuation abnormal state is not present in the example of FIG. 3, and it is determined that the fluctuation abnormal state is present in the example of FIG. 4.

The notification control unit 15 performs notification to the occupant of the host vehicle 20. For example, the notification control unit 15 transmits a control signal to HMI 7 to notify the driver by at least one of displaying images of the display and outputting sound from the speaker. The notification control unit 15 may also perform notification to the driver by combining the vibration of the steering wheel of the host vehicle 20, the vibration of the seat, the vibration of the seat belt, the vibration of the pedal, the reaction force, and the like.

When the abnormal state determination unit 14 determines that the other vehicle 30 is in the fluctuation abnormal state, the notification control unit 15 notifies the occupant of the host vehicle 20 of the fluctuation abnormal state. When the fluctuation amount of the other vehicle 30 is larger than the fluctuation threshold, the notification control unit 15 notifies the occupant of the host vehicle 20 of the fluctuation abnormal state.

The vehicle control unit 16 can execute vehicle control including driving assistance control and automatic driving control of the host vehicle 20. The vehicle control unit 16 controls the host vehicle 20 by transmitting a control signal to the actuator 6. In the driving assistance control, the driving assistance (the addition of the steering amount, the change of the steering reaction force and the vehicle speed/acceleration/deceleration) is performed so that the host vehicle 20 travels along the target traveling locus. In the automatic driving control, the vehicle is controlled so that the host vehicle 20 travels along the target travel trajectory.

Figure 5:
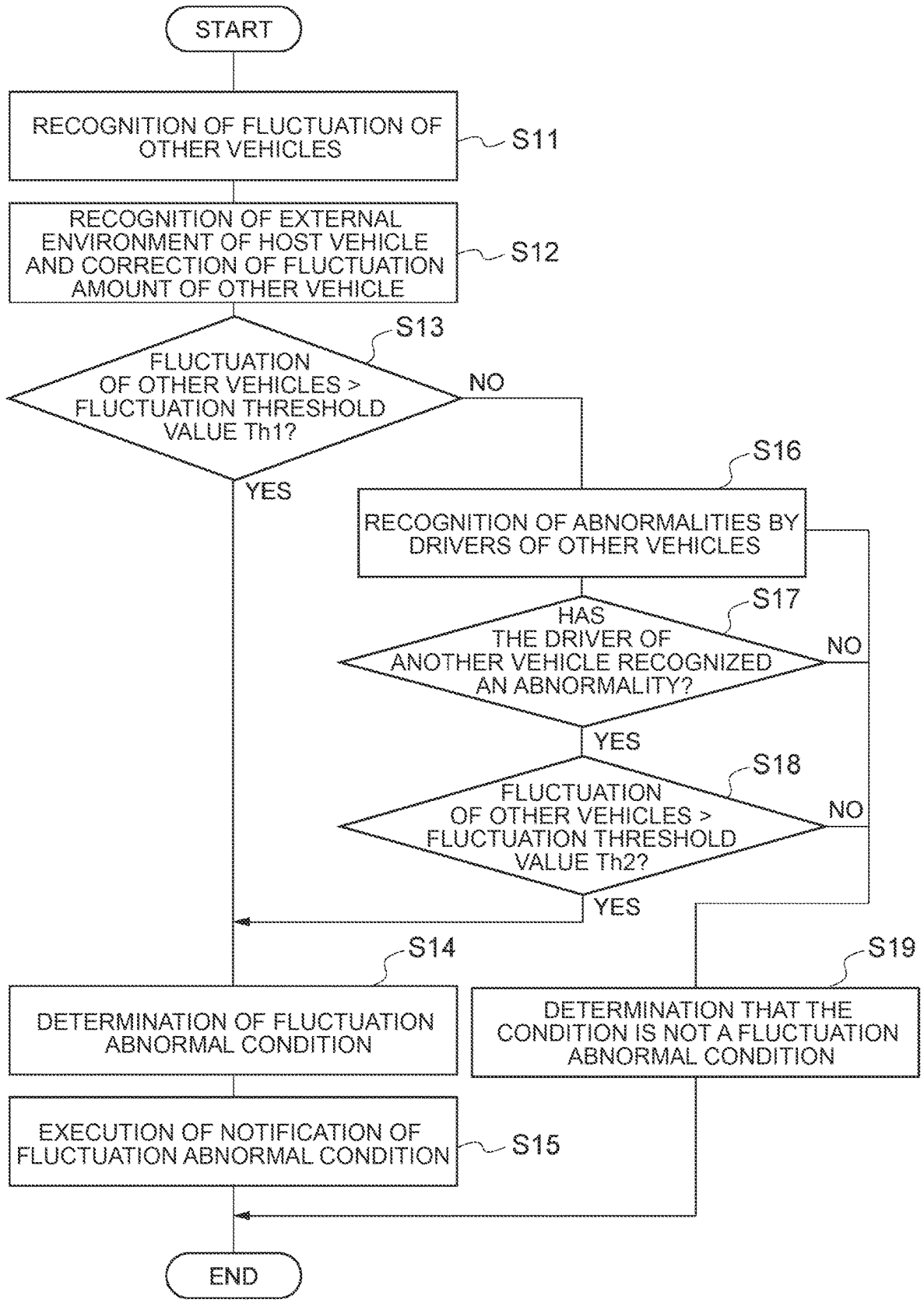
FIG. 5 is a flowchart illustrating an example of processing of the driving assistance device of FIG. 1.

The vehicle control includes avoidance control of the host vehicle 20. The avoidance control is a control for automatically avoiding danger to the host vehicle 20. The avoidance control includes lane change, obstacle avoidance control, acceleration control, and stop control (retreat) to the road shoulder. When the abnormal state determination unit 14 determines that the other vehicle 30 is in the fluctuation abnormal state, the vehicle control unit 16 may propose an avoidance control to the occupant of the host vehicle 20. In a case where an emergency is required to avoid danger, the vehicle control unit 16 may omit the proposal and execute the avoidance control of the host vehicle 20. An example of an arithmetic process by an ECU Next, an exemplary arithmetic process by ECU 10 will be described. FIG. 5 is a flowchart illustrating an example of a process performed by the driving assistance device of FIG. 1. The processing illustrated in FIG. 5 is repeatedly performed at a predetermined cycle, for example, while the host vehicle 20 is traveling.

As illustrated in FIG. 5, ECU 10 recognizes the fluctuation amount of the other vehicles by the fluctuation amount recognition unit 12 in S11. The fluctuation amount recognition unit 12 recognizes the fluctuation amount of the other vehicle 30 traveling around the host vehicle 20 based on the detection result of the external sensor 1 or the external camera 2 provided in the host vehicle 20.

In S12, ECU 10 uses the fluctuation amount recognition unit 12 to recognize the external environment of the host vehicle 20 and correct the fluctuation amount of the other vehicle 30. For example, the fluctuation amount recognition unit 12 recognizes the road surface condition of the road 50 of the host vehicle 20 and the other vehicle 30 on the basis of the captured image of the external camera 2, and corrects the fluctuation amount of the other vehicle 30 on the basis of the road surface condition.

In S13, ECU 10 compares the fluctuation amounts of the other vehicles 30 with the fluctuation thresholds by the abnormal state determination unit 14. For example, the abnormal state determination unit 14 determines whether or not the fluctuation amount of the other vehicle 30 is larger than the fluctuation threshold value Th1.

When the abnormal state determination unit 14 determines that the fluctuation amount of the other vehicle 30 is larger than the fluctuation threshold value Th1 (S13: YES), ECU 10 proceeds to S14. In S14, ECU 10 determines that the other vehicle 30 is in a fluctuation abnormal state by the abnormal state determination unit 14. That is, the abnormal state determination unit 14 determines whether or not the other vehicle 30 is in the fluctuation abnormal state, based on the comparison result between the fluctuation amount of the other vehicle 30 and the fluctuation threshold value.

In S15, ECU 10 causes the notification control unit 15 to execute notification regarding the fluctuation abnormal condition. The notification control unit 15, for example, uses a HMI 7 provided in the host vehicle 20 to display images, output sounds, or the like related to a fluctuation abnormal condition, for an occupant of the host vehicle 20. Thereafter, ECU 10 ends the process of FIG. 5.

On the other hand, when the abnormal state determination unit 14 determines that the fluctuation amount of the other vehicle 30 is equal to or less than the fluctuation threshold value Th1 (S13: NO), ECU 10 proceeds to S16. In S16, ECU 10 causes the driver abnormality recognition unit 13 to recognize an abnormality of the driver of the other vehicle 30. The driver abnormality recognition unit 13 recognizes the abnormality of the driver of the other vehicle 30 based on the captured image of the external camera 2 provided in the host vehicle 20.

In S17, ECU 10 determines whether or not the abnormality of the driver 31 of the other vehicle 30 has been recognized by the abnormal state determination unit 14. When the abnormal state determination unit 14 determines that the abnormality of the driver 31 of the other vehicle 30 has been recognized (S17: YES), ECU 10 proceeds to S18. On the other hand, when the abnormal state determination unit 14 determines that the abnormality of the driver 31 of the other vehicle 30 is not recognized (S17: NO), ECU 10 proceeds to S19.

In S18, ECU 10 compares the fluctuation amounts of the other vehicles 30 with the fluctuation thresholds by the abnormal state determination unit 14. For example, the abnormal state determination unit 14 determines whether or not the fluctuation amount of the other vehicle 30 is larger than the fluctuation threshold value Th2.

When the abnormal state determination unit 14 determines that the fluctuation amount of the other vehicle 30 is larger than the fluctuation threshold value Th2 (S18: YES), ECU 10 proceeds to the above-described S14. In the above-described S14, ECU 10 determines that the other vehicle 30 is in a fluctuating abnormal state by the abnormal state determination unit 14. That is, the abnormal state determination unit 14 determines whether or not the other vehicle 30 is in the fluctuation abnormal state, based on the comparison result between the fluctuation amount of the other vehicle 30 and the fluctuation threshold value.

On the other hand, when the abnormal state determination unit 14 determines that the fluctuation amount of the other vehicle 30 is equal to or less than the fluctuation threshold value Th2 (S18: NO), ECU 10 proceeds to S19. In S19, ECU 10 causes the abnormal state determination unit 14 to determine that the other vehicle 30 is not in a fluctuating abnormal state. Thereafter, ECU 10 ends the process of FIG. 5.

According to the driving assistance device 100 described above, the fluctuation threshold value Th2 when the abnormality of the driver 31 of the other vehicle 30 is recognized as a smaller absolute value compared to the fluctuation threshold value Th1 when the abnormality of the driver 31 of the other vehicle 30 is not recognized, it is determined whether the fluctuation abnormal state. Thus, even if the fluctuation amount FL9 in the case where the abnormality of the driver 31 of the other vehicle 30 is not recognized and the other vehicle 30 is fluctuated due to an external environment such as wind or road surface conditions, and the fluctuation amount FL2 in the case where the abnormality of the driver 31 of the other vehicle 30 is recognized are approximately the same, it is easily determined that the fluctuation abnormality state is the case where the abnormality of the driver 31 of the other vehicle 30 is recognized. Therefore, according to the driving assistance device 100, it is possible to perform the driving assistance including the notification to the occupant of the host vehicle 20 in accordance with the cause of the fluctuation amount of the other vehicle 30.

The fluctuation amount recognition unit 12 recognizes the road surface conditions of the host vehicle 20 and the road 50 of the other vehicle 30 based on the captured image of the external camera 2, and corrects the fluctuation amount of the other vehicle 30 based on the road surface conditions. Accordingly, by using the fluctuation amount FL2 corrected based on the road surface condition, it is possible to more appropriately determine whether or not the other vehicle 30 is in a fluctuation abnormal state in accordance with the road surface condition.

Modification

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

Figure 6:
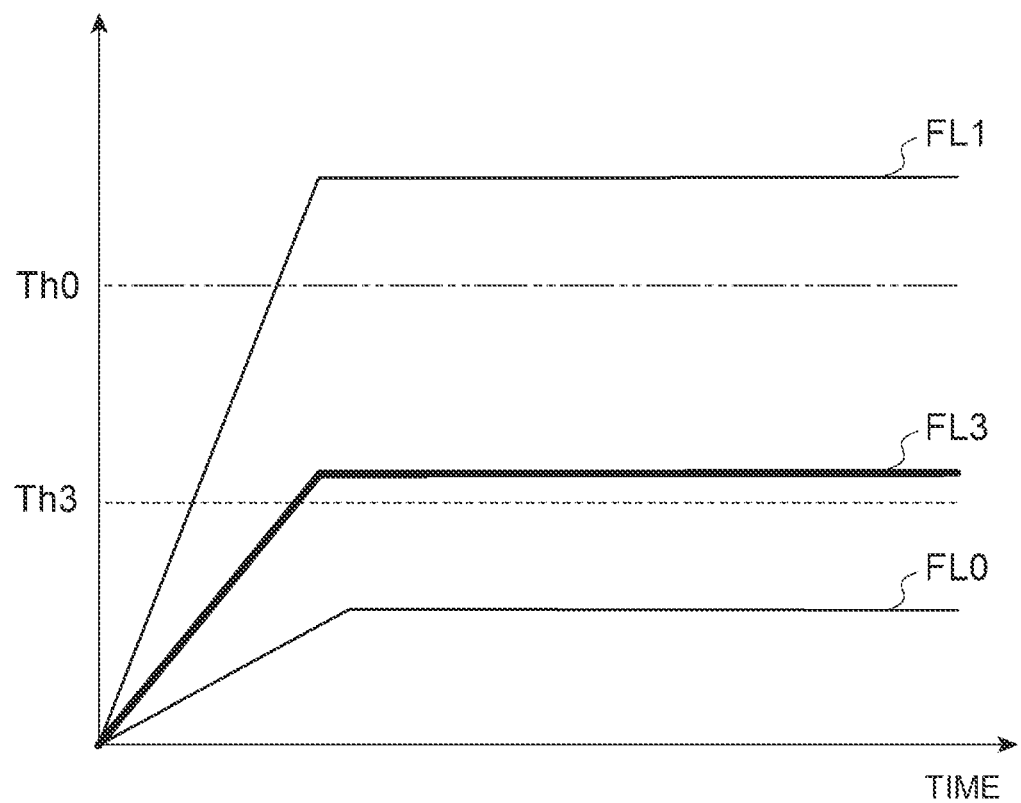
FIG. 6 is a diagram illustrating a fluctuation threshold value corrected according to a road surface situation in a case where an abnormality of a driver of another vehicle is recognized.

In the above-described embodiment, the fluctuation amount recognition unit 12 corrects the fluctuation amount of the other vehicle 30 based on the road surface condition, for example, but may correct the fluctuation threshold. FIG. 6 is a diagram illustrating a fluctuation threshold value corrected according to a road surface condition in a case where an abnormality of a driver of another vehicle is recognized. In FIG. 6, the fluctuation amount FL0 and the fluctuation amount FL1 are the same as the fluctuation amounts shown in FIG. 3 and FIG. 4. The fluctuation amount FL3 is, for example, a fluctuation amount in which the fluctuation amount of the other vehicle 30 viewed from the host vehicle 20 is apparently smaller than the fluctuation amount FL2 as a result of the influence of the rut 51 in FIG. 2 that the influence of the host vehicle 20 moving in the vehicle widthwise direction becomes the same phase as the fluctuation amount of the other vehicle 30. Therefore, ECU 10 may change the fluctuation threshold value from the fluctuation threshold value Th2 to the fluctuation threshold value Th3 so that it is easy to determine that the other vehicle 30 is in a fluctuation abnormal condition even in the fluctuation amount FL3 that is apparently reduced. That is, the abnormal state determination unit 14 may recognize the road surface condition of the road 50 of the host vehicle 20 and the other vehicle 30 based on the captured image of the external camera 2, and correct the fluctuation threshold based on the road surface condition. The fluctuation threshold value Th3 can be set in advance based on, for example, a pre-test run.

FIG. 7 is a flowchart illustrating a process of the driving assistance device 100 according to the modification. The processing illustrated in FIG. 7 is repeatedly performed at a predetermined cycle, for example, while the host vehicle 20 is traveling. In the flow chart of FIG. 7, S12A and S18A are different from the flow chart of FIG. 5, and the rest of the process is the same.

In S12A, ECU 10 uses the fluctuation amount recognition unit 12 to recognize the external environment of the host vehicle 20 and correct the fluctuation threshold. For example, the fluctuation amount recognition unit 12 recognizes the road surface condition of the road 50 of the host vehicle 20 and the other vehicle 30 on the basis of the captured image of the external camera 2, and corrects the fluctuation threshold value on the basis of the road surface condition. In FIG. 6, the fluctuation amount recognition unit 12 corrects the fluctuation threshold value Th2 of FIG. 4 to the fluctuation threshold value Th3 based on the road surface condition.

In S18A, ECU 10 compares the fluctuation amounts of the other vehicles 30 with the fluctuation thresholds by the abnormal state determination unit 14. For example, the abnormal state determination unit 14 determines whether or not the fluctuation amount of the other vehicle 30 is larger than the fluctuation threshold value Th3.

When the abnormal state determination unit 14 determines that the fluctuation amount of the other vehicle 30 is larger than the fluctuation threshold value Th3 (S18A: YES), ECU 10 proceeds to the above-described S14. On the other hand, when the abnormal state determination unit 14 determines that the fluctuation amount of the other vehicle 30 is equal to or less than the fluctuation threshold value Th3 (S18A: NO), ECU 10 proceeds to S19.

According to the driving assistance device 100 according to the modification described above, the fluctuation amount recognition unit 12 recognizes the road surface condition of the road 50 of the host vehicle 20 and the other vehicle 30 on the basis of the captured image of the external camera 2, and corrects the fluctuation threshold of the other vehicle 30 on the basis of the road surface condition. Accordingly, by using the fluctuation threshold value Th3 corrected based on the road surface condition, it is possible to more appropriately determine whether or not the other vehicle 30 is in a fluctuation abnormal condition in accordance with the road surface condition.

In the above-described embodiment, the driving assistance device 100 is capable of executing the automatic driving control, but is not essential, and may be capable of executing at least only the notification to the occupant of the host vehicle 20.

In the above-described embodiment, the abnormal state determination unit 14 determines that the other vehicle 30 is in a fluctuation abnormal state, for example, when the fluctuation amount of the other vehicle 30 is larger than the fluctuation threshold, but the present disclosure is not limited thereto. The fluctuation amount may be defined with a sign or the like so that, for example, when the fluctuation amount of the other vehicle 30 is smaller than the fluctuation threshold value, it is determined that the other vehicle 30 is in a fluctuation abnormal state.

What is claimed is:

1. A driving assistance device that performs driving assistance including providing notifications to an occupant of a host vehicle that includes an external sensor and an external camera, the driving assistance device comprising:
   a processor; and
   a memory storing executable instructions that cause the processor to
   acquire a detection result from the external sensor and images captured by the external camera, wherein the images captured by the external camera include images of a front view of another vehicle showing a head position of a driver of the other vehicle;
   determine a fluctuation amount of the other vehicle traveling around the host vehicle, based on the acquired detection result;
   determine whether the driver of the other vehicle is impaired based on the acquired images, wherein
   the processor determines that the driver of the other vehicle is impaired when, in the captured front view of the other vehicle, the head position of the driver of the other vehicle is outside of a certain range visible through a windshield of the other vehicle;

compare the fluctuation amount of the other vehicle with a predetermined fluctuation amount;

determine whether the other vehicle is in a fluctuation abnormal state, based on the comparison result between the fluctuation amount of the other vehicle and a predetermined fluctuation amount, wherein the processor determines that the vehicle is in the fluctuation abnormal state when the fluctuation amount of the other vehicle and a predetermined fluctuation amount, wherein in a case where the processor determines that the driver of the other vehicle is impaired, the processor uses an absolute value of the predetermined fluctuation amount that is set lower than an absolute value of the predetermined fluctuation amount in a case where the processor determines that the driver of the other vehicle is not impaired; and notify the occupant of the host vehicle about the fluctuation abnormal state of the other vehicle by at least one of displaying a notification on a display of the host vehicle or outputting a sound from a speaker of the host vehicle.

2. The driving assistance device according to claim 1, wherein the executable instructions further cause the processor to recognize a road surface condition of a road on which the host vehicle and the other vehicle are travelling based on the captured image, and correct the fluctuation amount of the other vehicle based on the recognized road surface condition.

3. The driving assistance device according to claim 1, wherein the executable instructions further cause the processor to cause at least one of a steering wheel, a seat, a seat belt, or a pedal of the host vehicle to vibrate as part of the notifying of the occupant about the fluctuation abnormal state of the other vehicle.

\* \* \* \* \*